United States Patent [19]
Squires et al.

[11] Patent Number: 6,129,310
[45] Date of Patent: Oct. 10, 2000

[54] AIRCRAFT NOSE LANDING GEAR

[75] Inventors: Thomas J. Squires, Wichita; Roger A. Depenbusch, Cheney, both of Kans.; Annette K. Dong, Renton, Wash.

[73] Assignee: The Boeing Company, Seattle, Wash.

[21] Appl. No.: 09/368,556

[22] Filed: Aug. 5, 1999

Related U.S. Application Data

[63] Continuation of application No. 08/918,336, Aug. 26, 1997, Pat. No. 6,016,995.
[51] Int. Cl.⁷ .................................................. B64C 25/10
[52] U.S. Cl. ............................... 244/102 R; 244/102 SL; 244/103 R; 244/17.17
[58] Field of Search ........................... 244/100 R, 102 R, 244/102 SL, 103 R, 17.17, 104 FP, 104 R

[56] References Cited

U.S. PATENT DOCUMENTS

| | | | |
|---|---|---|---|
| 4,720,063 | 1/1988 | James et al. | 244/102 R |
| 5,110,068 | 5/1992 | Grande et al. | 244/102 SL |
| 5,337,976 | 8/1994 | Derrien | 244/104 FP |
| 5,482,228 | 1/1996 | Hoshino | 244/102 R |

*Primary Examiner*—J. Woodrow Eldred
*Attorney, Agent, or Firm*—Conrad O. Gardner

[57] ABSTRACT

An aircraft nose landing gear installation that utilizes a single piece pin inserted through the gear fittings and into the two piece, fail safe support structure without requiring mechanical retention on the outside of the wheel well.

1 Claim, 5 Drawing Sheets

AIRCRAFT NOSE LANDING GEAR

CROSS-REFERENCE TO RELATED APPLICATIONS

This application is a continuation application of prior application Ser. No. 08/918,336, filed Aug. 26, 1997, Allowed now U.S. Pat. No. 6,016,995.

BACKGOUND OF THE INVENTION

1. Field of the Invention

The present invention relates to a nose gear installation and more particularly to a means for securing an aircraft nose landing gear assembly into the nose wheel well support structure of an aircraft.

2. Background Information

Prior Art Literature

U.S. Pat. No. 5,337,976 to Derrien issued Aug. 16, 1994 which shows a dual purpose shock absorber/actuator including the feature of having a second stage that helps diminish the impact of a crash landing, the system being primarily directed toward rotorcraft which encounter these conditions during autorotation landings.

Prior Nose Gear Systems

As can be seen in FIG. 1, in prior commercial transport aircraft, the nose landing gear 12 generally consists of a shock strut assembly 10 and drag brace members 20. The shock strut carries the wheels (not shown) and steering mechanism (not shown) and pivots about trunnion pins 30. Bushings 40 located in the side walls of the nose wheel well receive and support the trunnion pins 30. The drag brace members 20 are used to unfold the landing gear and lock it in place when brace members 20 also brace the landing gear against forward and aft loads. The drag brace members 20 are secured to the nose wheel well support structure in a way substantially the same as the way in which the shock strut assembly 10 is secured to support structure.

Problems of the Prior Nose Gear Systems

The previous way of securing the nose landing gear assembly 12 to the nose wheel well structure is as shown in FIG. 2, the old method employs joints at each of the landing gear support fittings 45 having a spherically mounted self lubricating bearing 50, a cylindrical steel pin 60, and a corresponding cylindrical bushing 70 in the landing gear assembly 12. Also at each joint location, a retaining nut, lock wire and washers (not shown in FIG. 2) are secured to the steel pin on the outboard (pressurized) side of the nose wheel well structure.

It is very difficult for a production worker or mechanic to access the outboard side of the nose wheel well at each of the joint locations and install retaining nuts, washers and lockwires. Consequently, the initial installation and subsequent removal and replacement of nose landing gear assemblies is a difficult and time consuming operation requiring considerable skill and effort. Accordingly, there is a need for an improved nose landing gear trunnion pin joint for installation of landing gear assemblies into the nose wheel well that does not require outboard retaining nuts, washers, or lockwires. Such a landing gear assembly would be designed so that a mechanic could install, remove or replace the nose landing assembly without accessing the outboard side of the nose wheel well.

A further nose landing gear trunnion pin arrangement relies on outboard side installed retaining nuts and the like as described above. Such aircraft, however, use trunnion pins that install only from the inboard side. However, the landing gear support fittings in the nose wheel well are single piece fittings designed to a safe life requirement. Such aircraft use two-sided fittings that are designed to a fail safety requirement. These two-sided fittings require an inboard bushing and an outboard bushing and so, because an unrestrained outboard bushing could migrate outboard, trunnion pins were supplied with outboard retaining nuts.

SUMMARY OF THE INVENTION

The present invention provides a landing gear trunnion pin joint solving the aforementioned trunnion pin joint problem and provides for simplified manufacture, installation and removal of the nose gear.

Accordingly, the present aircraft nose landing gear installation provides conceptually a landing gear trunnion pin joint for mounting a landing gear assembly to an aircraft structure. It includes a trunnion pin, an inboard nose wheel well fitting, a corresponding outboard nose wheel well fitting, an inboard bushing and an outboard bushing symmetrically mounted in each of the fittings and a retention means. The retention means is a specially adapted retaining clip that is mounted to the outboard nose wheel well fitting and prevents the outboard bushing mounted in the outboard nose wheel well fitting from migrating out and away from the trunnion pin.

DESCRIPTION OF A PREFERRED EMBODIMENT

Figure 3:
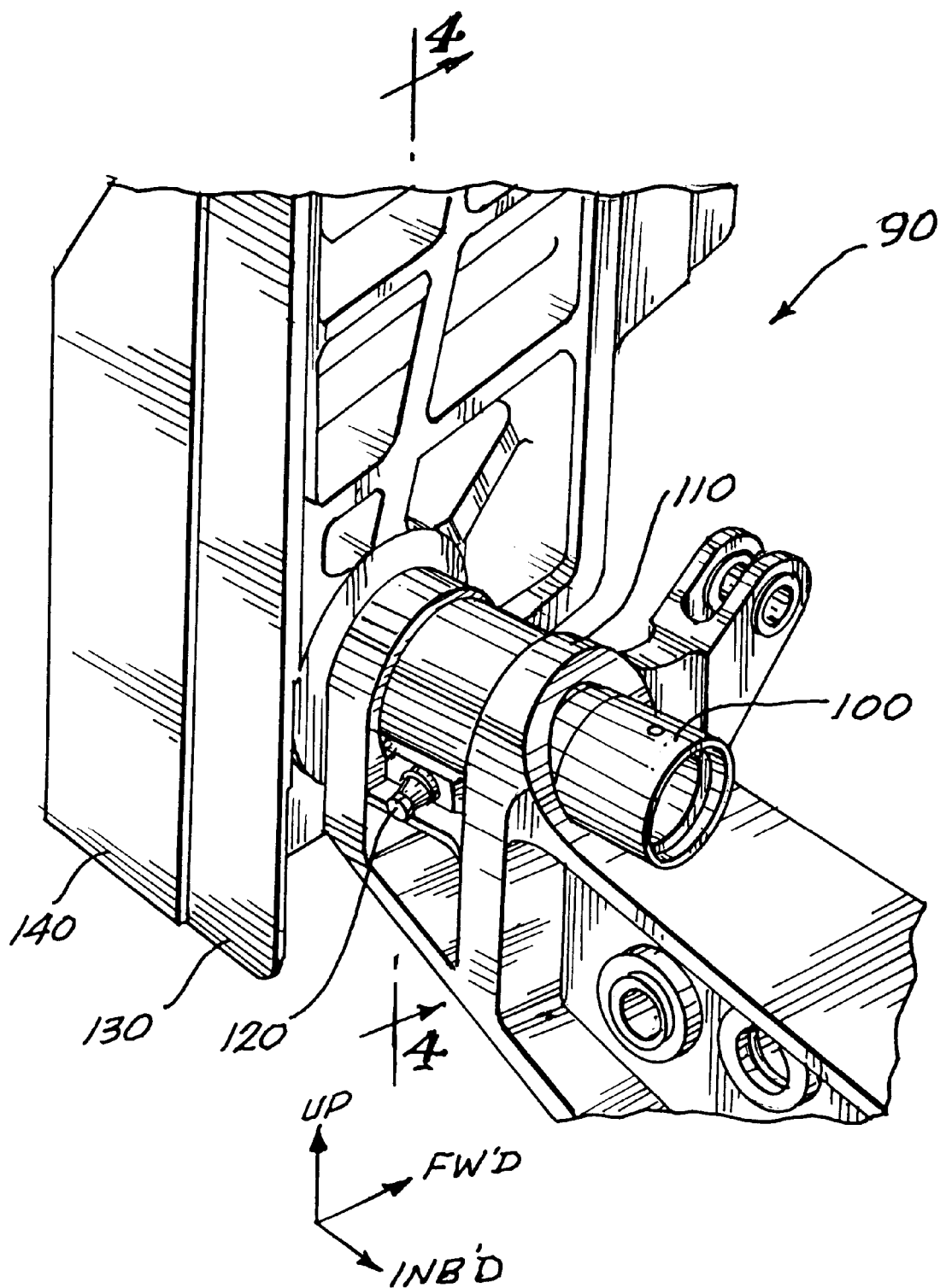
FIG. 3 is illustrative of the eight elements compromising the present trunnion pin joint.
Figure 4:
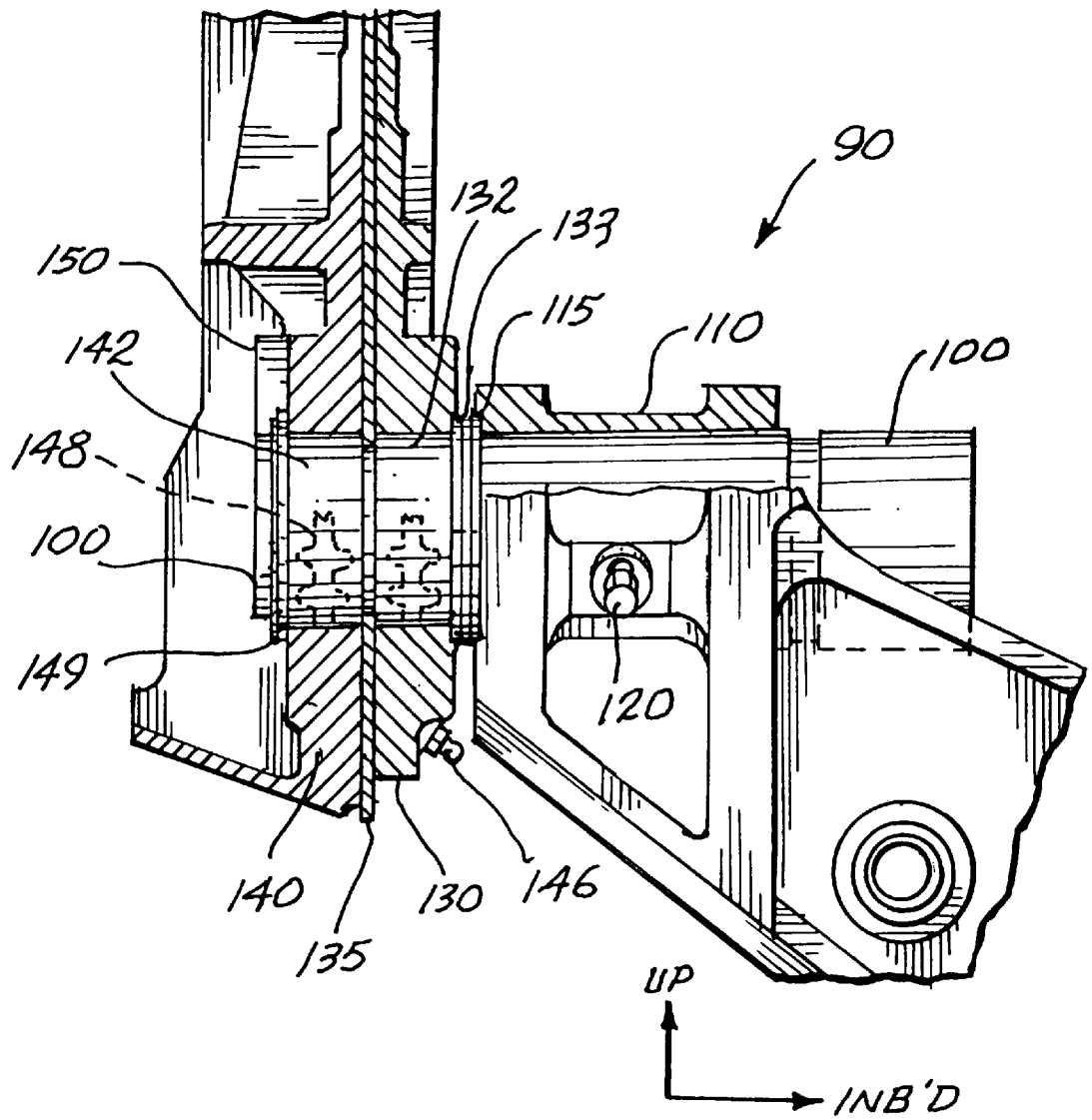
FIG. 4 is illustrative in more detail of the relationship of the elements shown in FIG. 3, including the manner in which the retaining clip functions to prevent outward migration of the outboard bushing.
Figure 5:
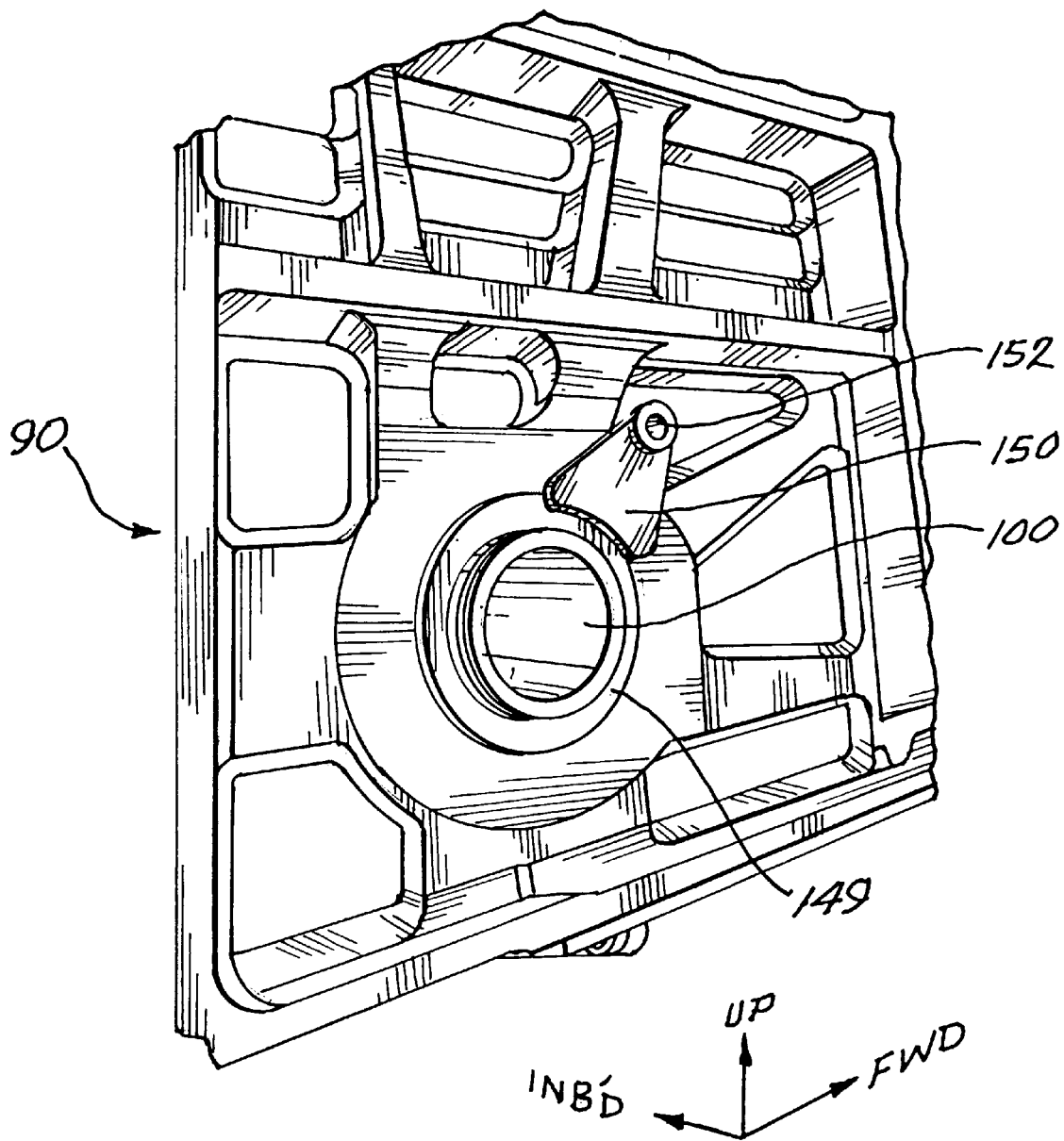
FIG. 5 is a view of the trunnion pin joint from the outside of the nose wheel well.

Turning now to FIGS. 3 and 4, it can be seen that the trunnion pin joint 90 according to the present system includes eight basic elements: a trunnion pin 100, a landing gear fitting 110, an inboard nose wheel well fitting 130, a nose wheel well web 135, an outboard nose wheel well fitting 140, an inboard bushing 132 and an outboard bushing 142 and an outboard bushing retention clip 150. Trunnion pin 100 is secured to landing gear fitting 110 by a retention bolt 120 which passes through cylindrical bores in the landing gear fitting (not shown) and corresponding bores in the trunnion pin (not shown). Inboard nose wheel well fitting 130 and outboard nose wheel well fitting 140 are mounted on opposite sides of nose wheel well web 135. As can be seen in the same way, outboard bushing 142 is fitted into an opposite cylindrical bore in outboard nose wheel well fitting 140. Both outboard bushing 142 and inboard bushing 132 concentrically receive trunnion pin 100. Nose wheel well web 135 has an opening adapted to clear trunnion pin 100. As landing gear fitting 110 is fitted up against inboard nose wheel well fitting 130 it is sometimes necessary to add shims 115. Further, both inboard and outboard bushings 132 and 142 have lubrication channels 148 formed in their inside surfaces to allow continuous lubrication of the trunnion pin and bushing surfaces. Lubricant is replenished to these channels through a lubrication fitting 146. Both inboard and outboard bushings 132 and 142 have outer flanges 133 and 149 respectively. Retaining clip 150 clamps down on an outer flange 149 of outboard bushing 142 and prevents it from migrating outboard and away from the trunnion pin joint. FIG. 5 is a view of the trunnion pin joint 90 from the outside of the nose wheel well and it shows that retaining clip 150 is secured to outboard nose wheel well fitting 140 by retaining clip bolt 152.

Figure 1:
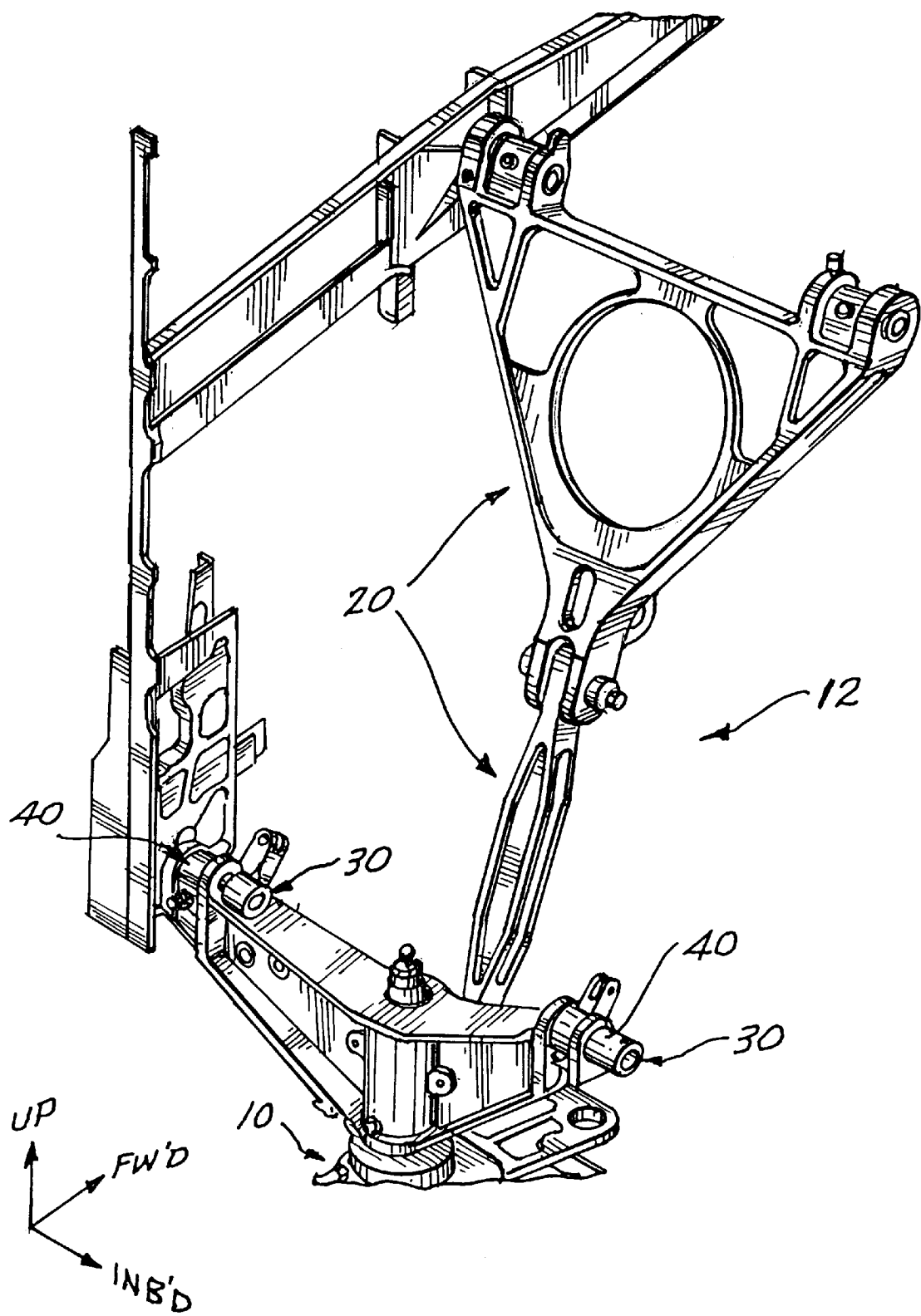
FIG. 1 is illustrative of a general aircraft nose gear assembly.
Figure 2:
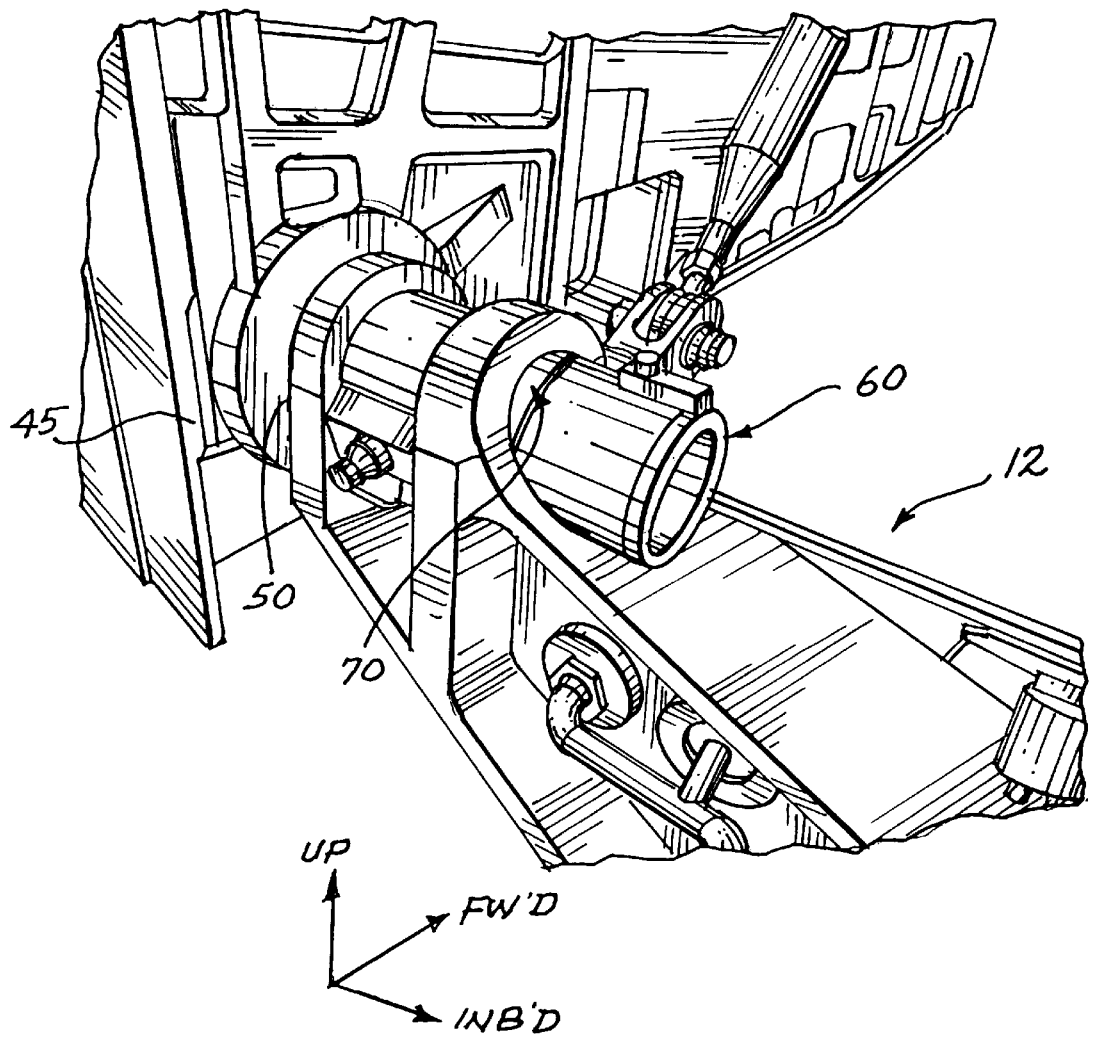
FIG. 2 is illustrative of the prior method of securing the nose landing gear assembly to the nose wheel well structure.

Reference numerals utilized in identifying component structure in the aforementioned detailed description:

FIGS. 1 and 2

| | |
|---|---|
| landing gear | 12 |
| shock strut assembly | 10 |
| drag brace members | 20 |
| trunnion pins | 30 |
| bushings | 40 |
| landing gear support fittings | 45 |
| self-lubricating bearing | 50 |
| cylindrical steel pin | 60 |
| cylindrical bushing | 70 |

FIGS. 3, 4 and 5

| | |
|---|---|
| trunnion pin joint | 90 |
| trunnion pin | 100 |
| landing gear fitting | 110 |
| shims | 115 |
| retention bolt | 120 |
| inboard nose wheel well fitting | 130 |
| inboard bushing | 132 |
| inboard bushing outer flange | 133 |
| wheel well web | 135 |
| outboard bushing | 142 |
| lubrication fitting | 146 |
| lubrication channels | 148 |

-continued

| | |
|---|---|
| outboard bushing outer flange | 149 |
| retaining clip | 150 |
| retaining clip bolt | 152 |

While a preferred embodiment of the invention has been illustrated and described, variations will be apparent to those skilled in the art. Accordingly, the invention is not to be limited to the specific embodiment illustrated and described, and the true scope of the invention is to be determined by reference to the following claims.

The embodiment of the invention in which an exclusive property or privilege is claimed are defined as follows:

What is claimed is:

1. In combination in an aircraft nose landing gear:
   a nose wheel well web (135);
   an inboard nose wheel well fitting (130) and an outboard nose wheel well fitting (140) mounted on opposite sides of said nose wheel web (135);
   said inboard nose wheel well fitting (130) having an inboard cylindrical bore;
   said outboard nose wheel well fitting (140) having an outboard cylindrical bore;
   an inboard bushing (132) fitted into said inboard cylindrical bore;
   an outboard bushing (142) fitted into said outboard cylindrical bore;
   a trunnion pin (100);
   said nose wheel web (135) adapted to clear said trunnion pin (100);
   a shock strut assembly for receiving said trunnion pin (100); said trunnion pin (100) further passing through said inboard cylindrical bore and said outboard cylindrical bore; and,
   said shock strut assembly shorter than the space between the inboard surfaces of said inboard (130) and outboard (140) nose wheel well fittings.

\* \* \* \* \*